United States Patent Office 3,832,340
Patented Aug. 27, 1974

---

3,832,340
SALTS OF NITROGEN BASES AND POLYSACCHARIDE SULFATES
Pierre Charles Wirth, Paris, France, assignor to Societe Generale de Recherche et d'Applications Scientifiques Sogeras, Paris, France
No Drawing. Filed Apr. 9, 1971, Ser. No. 132,831
Int. Cl. C07c 69/32, 129/18
U.S. Cl. 260—210 E   6 Claims

ABSTRACT OF THE DISCLOSURE

Salts formed between pharmaceutically active nitrogenous organic bases such as noscapine or papaverine and various polysaccharide sulphates such as arabogalactan sulphates or agarose sulphate. These salts have a longer duration of therapeutic activity than the bases themselves.

BACKGROUND OF THE INVENTION

There has long been a search for means to slow down and regulate the release of various pharmaceutically active agents in the body. Sustained release capsules and tablets of many types have been employed to effect this purpose. Natural or synthetic nitrogenous compounds such as promethazine, tetracycline and erythromycin useful as antibiotics, antihistamines or tranquilizers are most effective when administered over a long duration of sustained release of active ingredient.

It is an object of the invention to describe a novel method for such release and novel compositions to achieve this purpose.

BRIEF DESCRIPTION OF THE INVENTION

This invention is concerned with certain novel derivatives of pharmaceutically active nitrogenous organic bases and with the compositions containing them.

I have found that the salts formed between pharmaceutically active nitrogenous organic bases and polysaccharide sulphates have a longer duration of action than the bases themselves, so that the action of such salts is more regular and their effects more uniform, with longer intervals between doses, than that of the bases.

These salts are novel and constitute one aspect of the present invention.

The salts may be formed from any pharmaceutically active nitrogenous organic base, suitable bases including, for example, alkaloids, such as opium alkaloids and their derivatives, for example noscapine and papaverine, and a wide variety of natural or synthetic nitrogenous compounds which are active, for example, as antihistamines, tranquilizers or antibiotics, for example, promethazine, tetracycline and erythromycin.

The polysaccharide sulphate can be the sulphate derivative of any natural or synthetic polysaccharide. Suitable polysaccharide sulphates include, for example, arabogalactan sulphate and similar compounds, such as agarose sulphate, obtained by the sulphation of the corresponding polysaccharide, the arabogalactan of the former compound being extracted from various species of larch (Larix), whereas the agarose of the second compound is prepared from agar-agar or galactan. Suitable polysaccharide sulphates are further described in British Application No. 34,382/68 which is incorporated herein by reference.

The therapeutic activity of the novel polysaccharide sulphate salts is due solely to their basic portion, the polysaccharide sulphate portion serving only to increase the duration of action of the basic portion. The novel salts are obtained by the salification of the —$SO_3H$ acid groups of the polysaccharide sulphate by the particular nitrogenous organic base concerned, the active principle content of the resulting salt depending on the $SO_3H$ content of the polysaccharide sulphate. The physico-chemical properties of the novel salts are markedly different from those of the corresponding bases; more particularly the salts are much less water-soluble than the bases.

The present invention also comprises a process for making the novel salts, which comprises effecting double decomposition between a water-soluble alkali metal or alkaline earth metal salt of the polysaccharide sulphate and a water-soluble salt of the nitrogenous organic base; an insoluble salt is formed and precipitated.

The invention further comprises a pharmaceutical composition comprising a pharmaceutically effective dose of one of the novel salts described herein and an inert, physiologically acceptable carrier such as lactose, starch, sugar or methycellulose in a tablet or capsule for oral administration. A dose of tetracycline phosphate could be for example 250 mg./tablet in salt form.

In order that the invention be more fully understood, the following examples are given by way of illustration only:

EXAMPLE 1

Papaverine arabogalactan sulphate 55 g. of papaverine hydrochloride were dissolved in 2.5 liters of deionised water, and 53 g. of calcium arabogalactan sulphate were dissolved in 0.2 liters of water. The papaverine hydrochloride solution was poured slowly into the calcium arabogalactan sulphate solution with vigorous agitation. The precipitate which formed, was filtered, washed with water, re-filtered and dried *in vacuo* at 50° C.

The papaverine base content of the resulting salt was 61% based on the dry product.

EXAMPLE 2

Noscapine arabogalactan sulphate 70 g. of noscapine hydrochloride were dissolved in 1 liter of deionised water, and 50 g. of calcium arabogalactan sulphate were dissolved in 200 ml. of water. The noscapine solution was poured into the arabogalactan sulphate solution with agitation. The precipitate was filtered off, washed in water, re-filtered and dried *in vacuo* at 50° C.

The noscapine base content of the salt formed was 65% based on the dry product.

EXAMPLE 3

Promethazine arabogalactan sulphate 47 g. of promethazine hydrochloride were dissolved in 0.2 liter of deionised water and 50 g. of calcium arabogalactan sulphate were dissolved in 0.2 liter of water. The promethazine hydrochloride solution was slowly poured into the calcium arabogalactan sulphate solution with vigorous agitation. The precipitate was collected by filtration, washed in water, re-filtered, and then dried *in vacuo* at 50° C.

The promethazine base content of the salt formed was 58% based on the dry product.

EXAMPLE 4

Tetracycline arabogalactan sulphate 75 g. of tetracycline hydrochloride were dissolved in 1 liter of deionised water, and 60 g. of calcium arabogalactan sulphate were dissolved in 0.2 liter of water. The tetracycline hydrochloride solution was poured into the calcium arabogalactan sulphate solution with mechanical agitation. The precipitate is collected by filtration, washed with water, re-filtered and dried *in vacuo* at 50° C.

The tetracycline base content of the salt formed was 53% based on the dry product.

EXAMPLE 5

Erythromycin arabogalactan sulphate 22.50 g. of erythromycin base were suspended in 20 ml. of deionised water and sufficient hydrochloric acid was added to dissolve the erythromycin in hydrochloride form. The solution obtained was poured into a calcium arabogalactan sulphate solution prepared by dissolving 10 g. of calcium arabogalactan sulphate in 20 ml. of water. The precipitates in the form of a light-brown product which is collected by separation, then dried *in vacuo* at 60° C.

The erythromycin base content of the salt formed was 74% based on the dry product.

What is claimed is:

1. A pharmaceutically acceptable salt of a pharmaceutically active nitrogenous organic base selected from the group consisting of noscapine, papaverine, antihistamine, tetracycline, erythromycin and promethazine and a polysaccharide galactan sulphate.

2. A pharmaceutically acceptable salt of claim 1 which is papaverine arabogalactan sulphate.

3. A pharmaceutically acceptable salt of claim 1 which is noscapine arabogalactan sulphate.

4. A pharmaceutically acceptable salt of claim 1 which is promethazine arabogalactan sulphate.

5. A pharmaceutically acceptable salt of claim 1 which is tetracycline arabogalactan sulphate.

6. A pharmaceutically acceptable salt of claim 1 which is erythromycin arabogalactan sulphate.

References Cited

UNITED STATES PATENTS

| | | | |
|---|---|---|---|
| 2,697,093 | 12/1954 | Jones | 260—234 R |
| 2,959,583 | 11/1960 | Doczi | 260—234 R |
| 3,524,847 | 8/1970 | Grotsch et al. | 260—234 R |
| 3,558,594 | 1/1971 | Jones et al. | 260—210 E |
| 3,686,164 | 8/1972 | Unger et al. | 260—234 R |

JOHNNIE R. BROWN, Primary Examiner

U.S. Cl. X.R.

260—209 R, 234 R; 424—180, 181